United States Patent
Ikegami

(10) Patent No.: US 12,553,368 B2
(45) Date of Patent: Feb. 17, 2026

(54) INTERNAL COMBUSTION ENGINE

(71) Applicant: TOYOTA JIDOSHA KABUSHIKI KAISHA, Toyota (JP)

(72) Inventor: Hiroaki Ikegami, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/951,937

(22) Filed: Nov. 19, 2024

(65) Prior Publication Data

US 2025/0172078 A1    May 29, 2025

(30) Foreign Application Priority Data

Nov. 27, 2023  (JP) .................. 2023-199739

(51) Int. Cl.
*F01M 1/02*    (2006.01)

(52) U.S. Cl.
CPC ....... *F01M 1/02* (2013.01); *F01M 2001/0276* (2013.01)

(58) Field of Classification Search
CPC ....................................................... F01M 1/02
See application file for complete search history.

(56) References Cited

FOREIGN PATENT DOCUMENTS

| JP | 2009-281177 A | 12/2009 |
| JP | 2016061195 A * | 4/2016 |

* cited by examiner

*Primary Examiner* — Kevin A Lathers
(74) *Attorney, Agent, or Firm* — SoraIP, Inc.

(57) ABSTRACT

The internal combustion engine includes an oil storage portion in which a suction portion of oil supplied to various parts of the internal combustion engine body is disposed, an oil channel through which the bubble-containing oil returned from the various parts of the internal combustion engine body to the oil storage portion flows, and a high pressure portion in which the oil is supplied and becomes higher than the atmospheric pressure, and an oil injection hole for injecting oil toward the bubble-containing oil flowing in the oil channel is provided.

4 Claims, 6 Drawing Sheets

INTERNAL COMBUSTION ENGINE

CROSS-REFERENCE TO RELATED APPLICATION

This application claims priority to Japanese Patent Application No. 2023-199739 filed on Nov. 27, 2023, incorporated herein by reference in its entirety.

BACKGROUND

1. Technical Field

The disclosure relates to internal combustion engines.

2. Description of Related Art

Engine oil (hereinafter simply referred to as "oil") circulates inside an internal combustion engine. Oil is sometimes aerated while circulating inside the internal combustion engine. Aeration is a phenomenon that bubbles are mixed into oil. Aeration degrades the functions of oil to lubricate and cool various parts of the internal combustion engine. Conventionally, there has been proposed a baffle member having a tray portion for storing oil in order to reduce the influence of aeration (see, for example, Japanese Unexamined Patent Application Publication No. 2009-281177 (JP 2009-281177 A)). Oil stored in the tray portion is returned to an oil pan through an oil return hole provided in the baffle member. The oil returned to the oil pan is sucked up again by an oil strainer and circulates inside the internal combustion engine.

SUMMARY

In the proposal of JP 2009-281177 A, bubbles in the oil are reduced while the oil is stored in the tray portion and passes through the baffle member. However, the proposal of JP 2009-281177 A is to wait for the bubbles to naturally disappear. Therefore, if the amount of bubbles increases, the bubbles will not disappear fast enough that the content of the bubbles in the oil will increase.

An object of the disclosure disclosed in the present specification is to efficiently eliminate bubbles that are contained in oil circulating inside an internal combustion engine.

This object is achieved by an internal combustion engine. The internal combustion engine includes:
an oil storage portion in which a suction portion is disposed, the suction portion being a portion that sucks oil to be supplied to various parts of an internal combustion engine body;
an oil channel through which bubble-containing oil to be returned from the various parts of the internal combustion engine body to the oil storage portion flows; and
a high pressure portion that has a higher pressure than an atmospheric pressure and to which the oil is supplied, the high pressure portion being provided with an oil injection hole through which the oil is injected toward the bubble-containing oil flowing through the oil channel.

In the internal combustion engine having the above configuration,
the high pressure portion may be a balancer housing chamber in which a balancer of a balancer device is housed, and the oil injection hole may be provided in a housing that constitutes the balancer housing chamber.

In the internal combustion engine having the above configuration,
a drive unit that rotates a balancer shaft of the balancer device may be housed in a drive unit housing chamber that is provided as a separate space different from the balancer housing chamber.

In addition, in the internal combustion engine having the above configuration,
the high pressure portion may be an oil discharge channel to which the oil sucked up by an oil pump via the suction portion is discharged, and the oil injection hole may be provided in the oil discharge channel.

Furthermore, in the internal combustion engine having the above configuration,
the oil channel may include a tilted surface along which the bubble-containing oil to be returned to the oil storage portion flows down, and the oil may be injected from the oil injection hole toward the tilted surface.

The disclosure disclosed in the present specification can efficiently eliminate bubbles that are contained in oil circulating inside an internal combustion engine.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
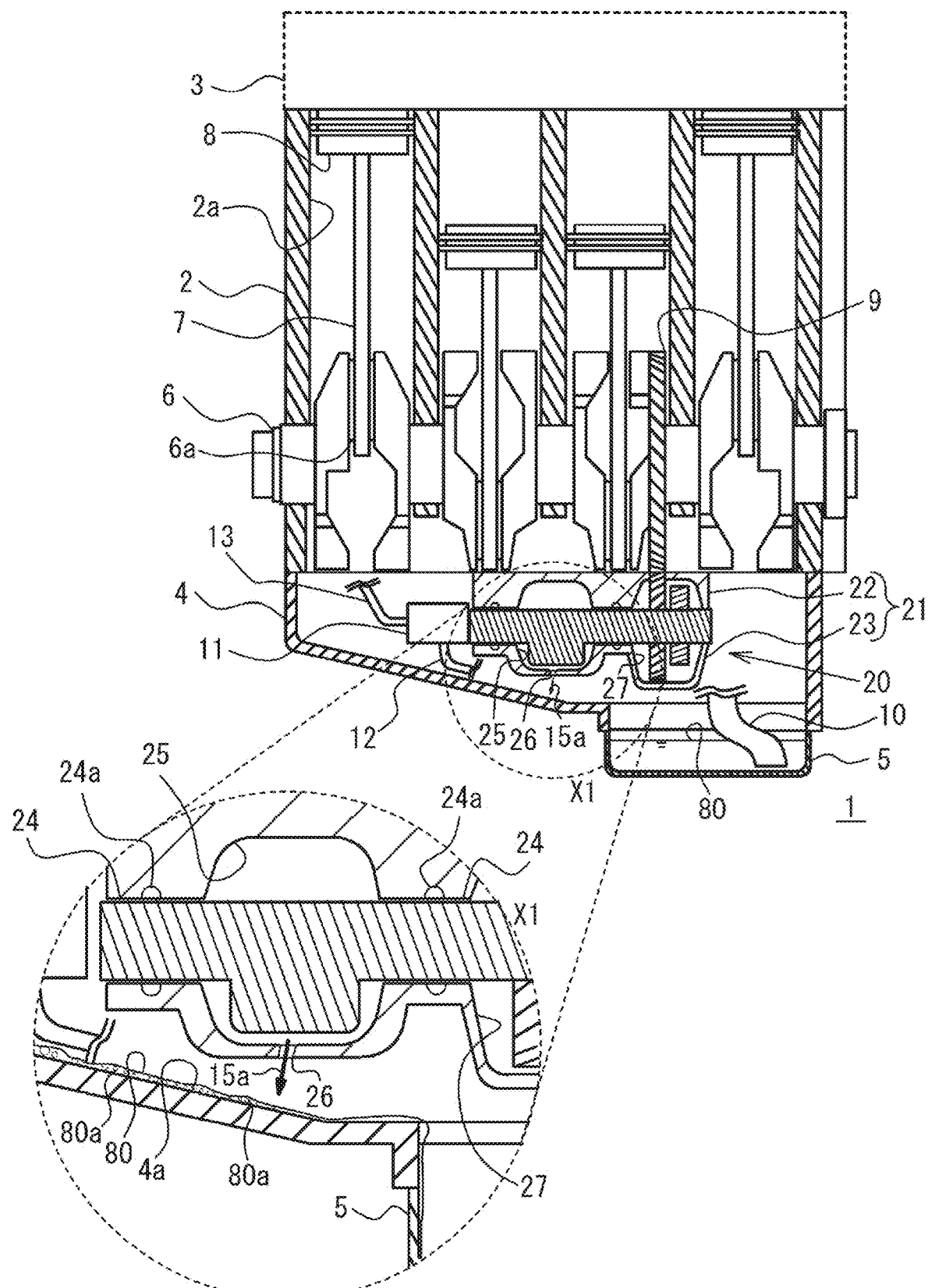
FIG. 1 is a cross-sectional view of an internal combustion engine according to a first embodiment taken along an axial direction of a crankshaft and an axial direction of a cylinder.

Embodiments of the present disclosure will now be described with reference to the accompanying drawings. In the drawings, the dimensions, ratios, and the like of each part may not be shown so as to completely coincide with actual ones. In the drawings, details are omitted.

First Embodiment

Configuration of Internal Combustion Engine

Figure 2:
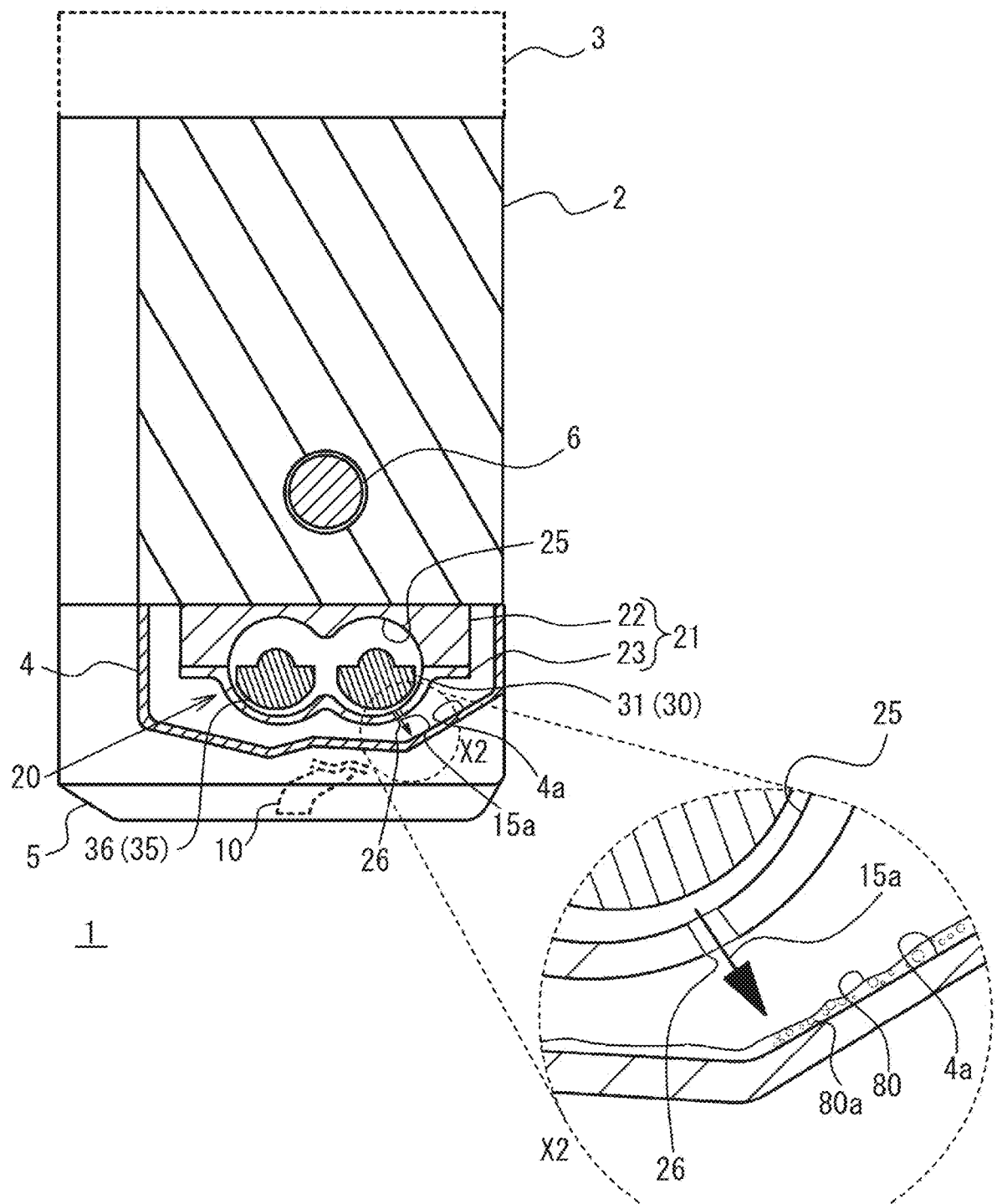
FIG. 2 is a cross-sectional view of the internal combustion engine of the first embodiment taken along a direction orthogonal to the axial direction of the crankshaft.

The internal combustion engine 1 of the present embodiment is an inline-four engine for an automobile using gasoline as a fuel. As shown in FIGS. 1 and 2, the internal combustion engine 1 includes a cylinder block 2, a cylinder head 3, and a crankcase 4. The cylinder head 3 is provided on the upper side of the cylinder block 2. The crankcase 4 is provided on the lower side of the cylinder block 2. An oil pan 5 is provided on the lower side of the crankcase 4. Note that the cylinder arrangement method, the number of cylinders, and the fuel used in the internal combustion engine are not limited thereto. In addition, the use of the internal combustion engine is not limited to the automobile. Internal combustion engines may be used in ships and general machinery.

The cylinder block 2 comprises four cylinders 2a arranged in series. The cylinder block 2 is provided with a crankshaft 6 whose axial direction is aligned with the arrangement direction of the cylinder 2a. The crank pin 6a of the crankshaft 6 is provided with a piston 8 via a connecting rod 7. The respective pistons 8 are provided so as to be able to reciprocate in the cylinder 2a. The crankshaft 6 includes a first gear 9. The first gear 9 drives the first balancer shaft 30 (see FIG. 3A and FIG. 3B) included in the balancer device 20 described later.

The cylinder head 3 includes an intake valve and an exhaust valve that are openable and closable with respect to a combustion chamber (not shown). The cylinder head 3 includes a valve driving mechanism that opens and closes an intake valve and an exhaust valve. In FIGS. 1 and 2, the intake valve, the exhaust valve, and the valve driving mechanism are omitted.

An upper portion of the crankcase 4 is open. The inside of the crankcase 4 communicates with the inside of the cylinder block 2. The lower portion of the crankcase 4 is open. An oil pan 5 is provided in the lower opening of the crankcase 4 so as to close the opening. A balancer device 20 is provided inside the crankcase 4.

The oil pan 5 corresponds to an oil storage portion, and can store the oil 80 therein. An oil strainer 10 corresponding to a suction portion of the oil 80 is disposed inside the oil pan 5. The oil strainer 10 is connected to an oil pump 11 via an oil suction channel 12. The oil pump 11 supplies the oil 80 sucked up from the inside of the oil pan 5 to various parts of the internal combustion engine body via the oil discharge channel 13. The oil pump 11 is driven via a sprocket included in the valve drive mechanism. The oil pump 11 may be driven by another conventionally known mechanism.

The internal combustion engine body includes a cylinder block 2, a cylinder head 3, a crankshaft 6, an intake valve, an exhaust valve, and a valve driving mechanism. The oil 80 discharged by the oil pump 11 is supplied to the various parts of the internal combustion engine body. The oil 80 supplied to the various parts of the internal combustion engine body and used for lubrication and cooling passes through the inside of the cylinder block 2 and the crankcase 4 and is returned to the inside of the oil pan 5. The inner peripheral wall surface 4a of the crankcase 4 forms an oil channel through which the oil 80 returned to 10 the oil pan 5 from the various parts of the internal combustion engine body flows. The oil 80 supplied to the various parts of the internal combustion engine body may be a bubble-containing oil that contains bubble 80a. For example, the oil 80 supplied around the rotating crankshaft 6 may generate aeration and contain bubble 80a.

Figure 3A:
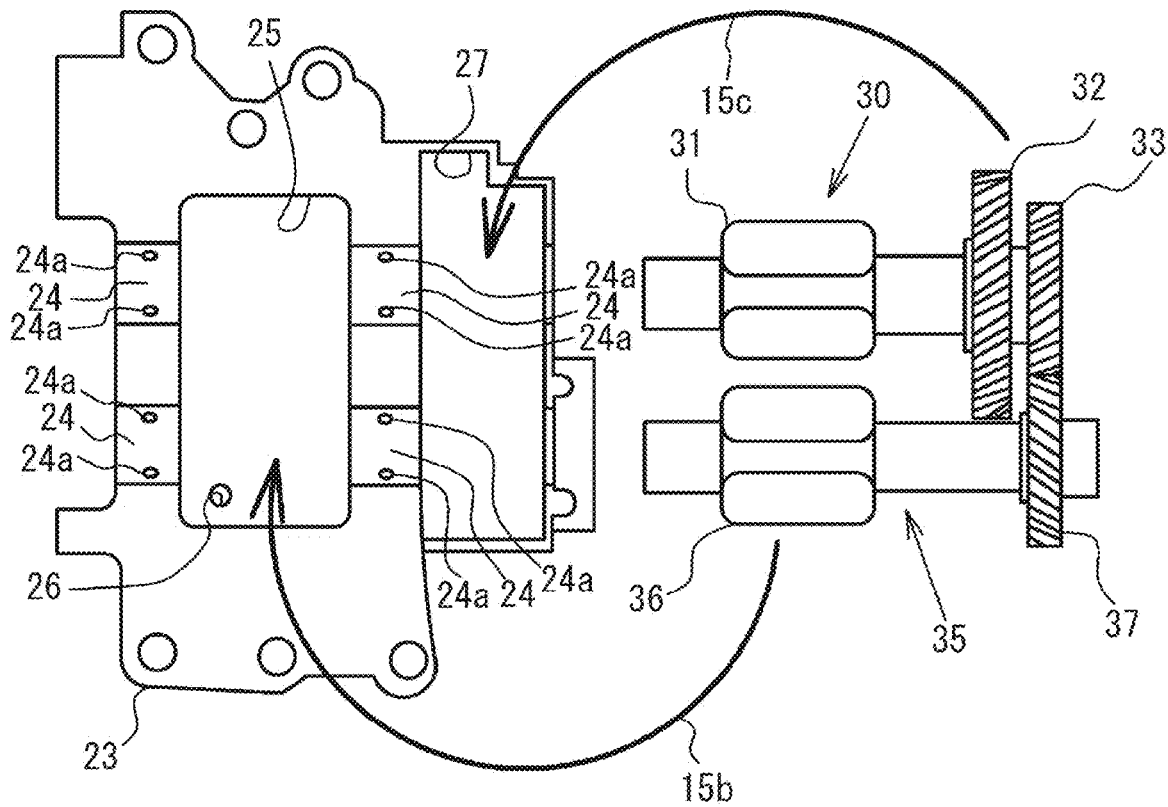
FIG. 3A is an exploded view of an internal combustion engine according to a first embodiment, in which an upper housing is removed from a balancer device and a first balancer shaft and a second balancer shaft are removed from a lower housing.

The balancer device 20 includes a first balancer shaft 30 and a second balancer shaft 35 housed in the housing 21. The housing 21 includes an upper housing 22 and a lower housing 23. FIG. 3A shows a state in which the upper housing 22 of the housing 21 is removed. FIG. 3A further shows that the first balancer shaft 30 and the second balancer shaft 35 are taken out from the lower housing 23.

The housing 21 includes a journal portion 24 that rotatably supports the first 20 balancer shaft 30 and the second balancer shaft 35. The journal portion 24 includes an oil supply port 24a. The oil 80 is supplied to the oil supply port 24a through the oil discharge channel 13. The oil 80 supplied to the oil supply port 24a also flows into the housing 21. The housing 21 includes a first chamber 25 and a second chamber 27. The first chamber 25 and the second chamber 27 are separated so as to be different spaces.

The first balancer shaft 30 includes a first balancer 31, a second gear 32, and a third gear 33. The first balancer 31 is an eccentric weight. The second gear 32 meshes with the first gear 9 included in the crankshaft 6. The third gear 33 meshes with the fourth gear 37 described later.

The second balancer shaft 35 includes a second balancer 36 and a fourth gear 37. The second balancer 36 is an eccentric weight similar to that of the first balancer 31. The fourth gear 37 meshes with the third gear 33.

The second gear 32, the third gear 33, and the fourth gear 37 correspond to a drive unit that rotates the first balancer shaft 30 and the second balancer shaft 35.

The first balancer shaft 30 and the second balancer shaft 35 are installed in the housing 21 so as to be supported by the journal portion 24. At this time, the first balancer 31 and the second balancer 36 are housed in the first chamber 25 as indicated by the arrow 15b. The first chamber 25 corresponds to a balancer housing chamber. The second gear 32, the third gear 33, and the fourth gear 37 are housed in the second chamber 27 as indicated by an arrow 15c. The second chamber 27 corresponds to a drive unit housing chamber.

When the internal combustion engine 1 is in operation, the pressure inside the first chamber 25 becomes higher than the atmospheric pressure. As shown in an enlarged view of X1 portion in FIGS. 1 and X2 portion in FIG. 2, an oil injection hole 26 is provided in a portion corresponding to the first chamber 25 of the housing 21. The oil 80 supplied into the first chamber 25 is injected to the outside of the first chamber 25 through the oil injection hole 26 as indicated by an arrow 15a.

Figure 3B:
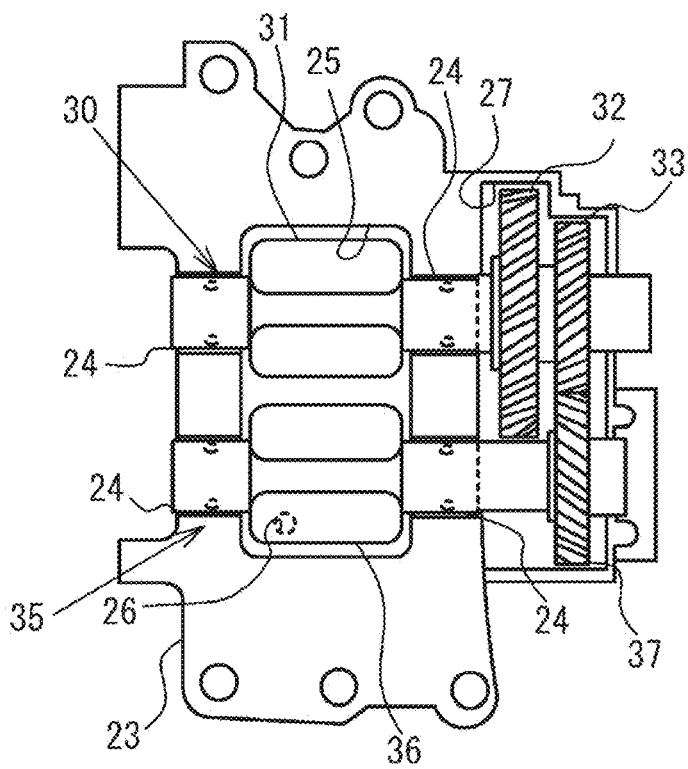
FIG. 3B is an explanatory view of an internal combustion engine according to a first embodiment, in which an upper is detached from a balancer device.
Figure 4:
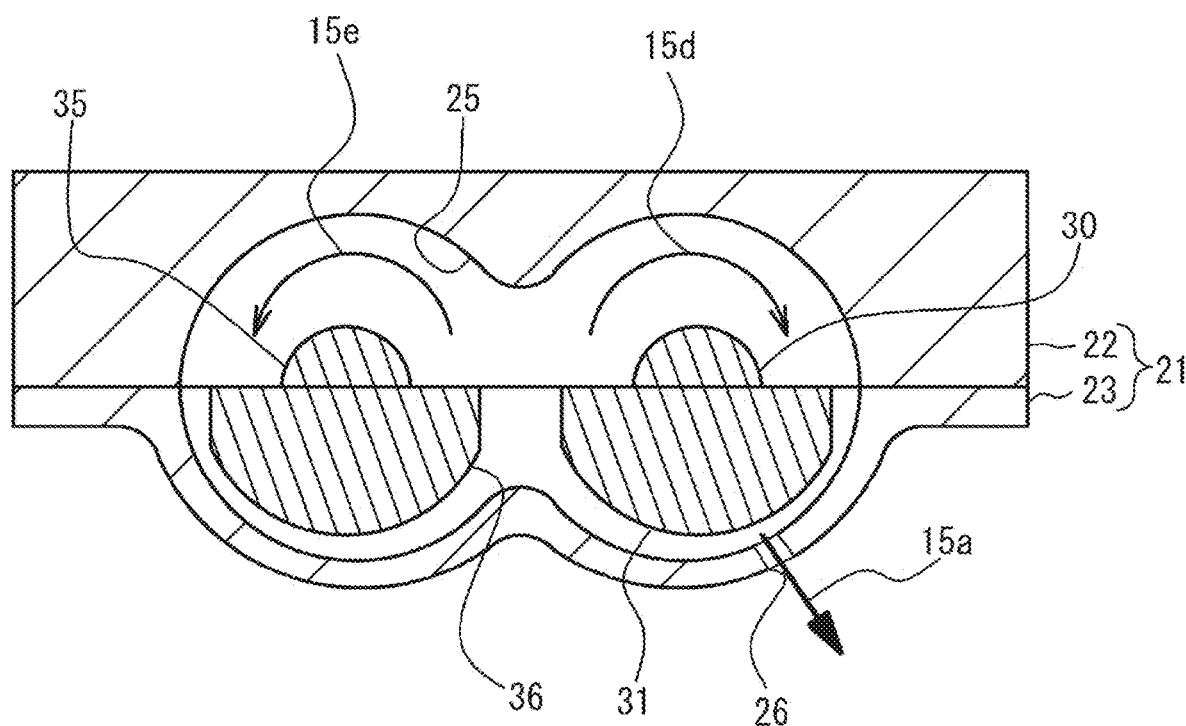
FIG. 4 is a sectional view of the balancer device taken along a direction orthogonal to the axial direction of the first balancer shaft and the second balancer shaft.

Here, referring to FIG. 3B and FIG. 4, the increase in the pressure in the first chamber 25 will be described. First, the crankshaft 6 (see FIG. 1) provided with the first gear 9 rotates. Then, the first balancer shaft 30 including the second gear 32 meshing with the first gear 9 rotates as indicated by the arrow 15d. Then, the second balancer shaft 35 including the fourth gear 37 meshing with the third gear 33 included in the first balancer shaft 30 rotates as indicated by the arrow 15e. When the first balancer shaft 30 rotates, the first balancer 31 rotates in the first chamber 25. When the second balancer shaft 35 rotates, the second balancer 36 rotates in the first chamber 25. When the positions of the first balancer 31 and the second balancer 36, which are eccentric weights, are sequentially changed in the circumferential direction, the pressure in the internal space of the first chamber 25 increases.

The oil 80 is supplied into the first chamber 25 through the oil supply port 24a. The oil 80 supplied into the first chamber 25 is jetted from the inside of the first chamber 25 at a high pressure through the oil injection hole 26.

The oil 80 is injected toward the inner peripheral wall surface 4a of the crankcase 4. The oil 80 jetted at high pressure crushes the bubble 80a contained in the oil 80 flowing along the inner peripheral wall surface 4a. As a result, the bubbles contained in the oil 80 disappear. As a result, the bubble ratio of the oil 80 decreases.

The inner peripheral wall surface 4a includes a part that is a tilted surface when the internal combustion engine 1 is mounted on a vehicle. The tilted surface is a surface other than a horizontal surface orthogonal to the vertical direction. The surface including the vertical direction may be included in the tilted surface. In short, a surface on which the oil 80 can flow down is included in the tilted surface. The oil injection hole 26 is provided so as to inject the oil 80 toward the tilted surface. The bubble-containing oil is returned from the cylinder block 2 to the oil pan 5 along the inner peripheral wall surface 4a. When the oil 80 is jetted toward the inner peripheral wall surface 4a including the tilted surface, the bubbles can be efficiently crushed.

Depending on the shape of the oil pan 5, the oil 80 may be injected toward the bubble-containing oil flowing through the inner peripheral wall surface of the oil pan 5.

In the balancer device 20 of the present embodiment, the first chamber 25 and the second chamber 27 are separately provided. This is because the second gear 32, the third gear 33, and the fourth gear 37 are rotated, so that the oil 80 is foamed and there is a possibility that the bubble 80a is mixed into the oil 80. It is advantageous that the oil 80 jetted to crush the bubble 80a is not mixed with the bubble 80a as much as possible. In the present embodiment, by providing the first chamber 25 and the second chamber 27 separately, it is possible to suppress the mixing of the bubble 80a into the oil 80 to be injected.

Effect

In the present embodiment, the oil injection hole 26 is provided in a high pressure portion having a pressure higher than the atmospheric pressure. The bubbles can be crushed by jetting the oil 80 from the oil injection hole 26 toward the bubble-containing oil flowing in the oil channel.

In the present embodiment, the high pressure portion is a first chamber 25 that is a balancer housing chamber, and an oil injection hole 26 is provided in the housing 21 that constitutes the first chamber 25. In the present embodiment, it is possible to efficiently crush the bubble 80a in the oil 80 by utilizing the high pressure in the first chamber 25.

In the present embodiment, the first chamber 25 and the second chamber 27, which is a drive unit housing chamber, are separately provided. As a result, it is possible to reduce the possibility of bubble 80a being mixed into the oil 80 in the first chamber 25.

Second Embodiment

Figure 5A:
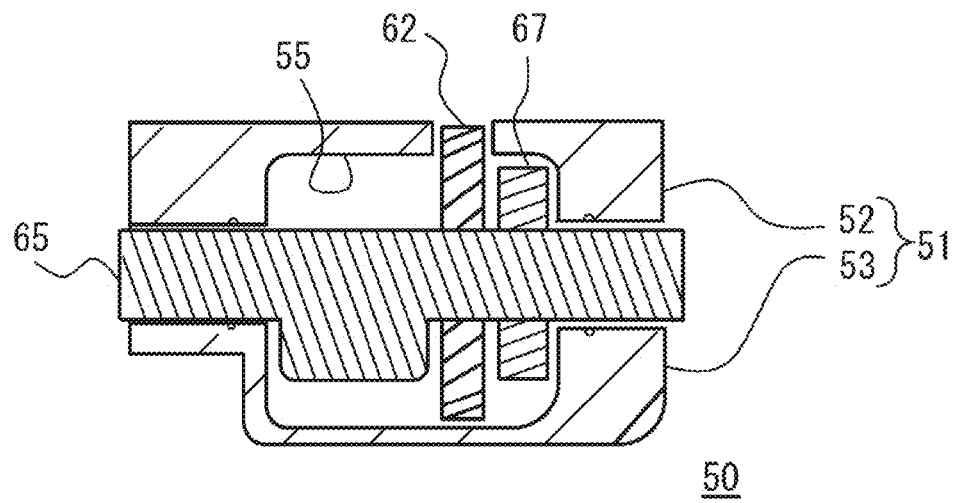
FIG. 5A is a sectional view of a balancer device taken along the axial direction of the second balancer shaft according to a second embodiment.
Figure 5B:
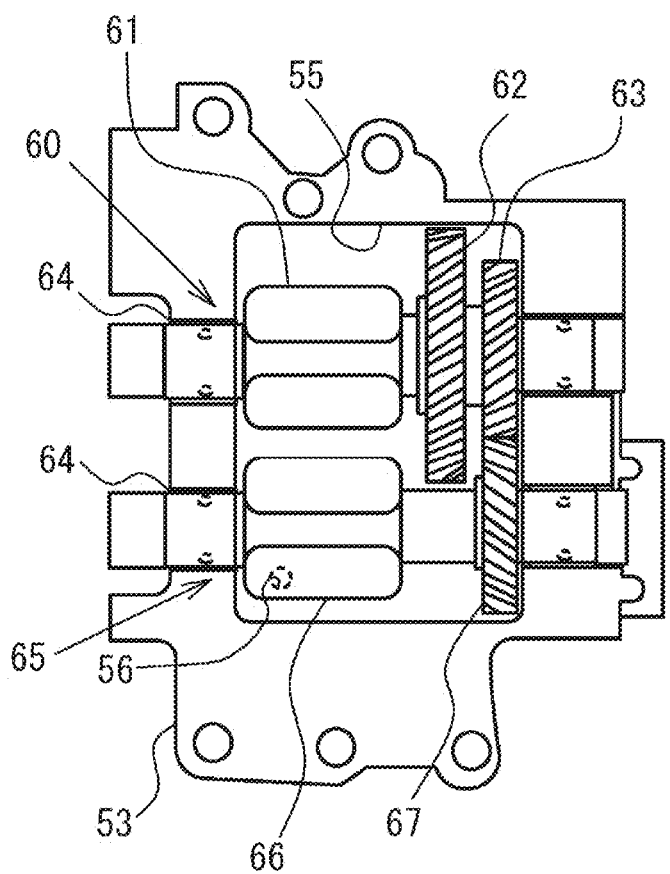
FIG. 5B is an explanatory view showing a state in which an upper housing is removed from a balancer device according to a second embodiment.

Next, a second embodiment will be described. In the second embodiment, the balancer device 50 shown in FIG. 5A is adopted instead of the balancer device 20 of the first embodiment. Balancer device 50 includes a housing 51, a first balancer shaft 60 and a second balancer shaft 65. The housing 51 includes an upper housing 52 and a lower housing 53. FIG. 5A is a cross-sectional view of a balancer device 50 taken along an axial direction of a second balancer shaft 65. FIG. 5B is an explanatory view of a state in which the upper housing 52 is removed from the balancer device 50.

The first balancer shaft 60 includes a first balancer 61, a second gear 62, and a third gear 63. The first balancer 61 is an eccentric weight. The second gear 62 meshes with the first gear 9 included in the crankshaft 6. The third gear 63 meshes with the fourth gear 67 described later.

The second balancer shaft 65 includes a second balancer 66 and a fourth gear 67. The second balancer 66 is an eccentric weight similar to that of the first balancer 61. The fourth gear 67 meshes with the third gear 63.

The second gear 62, the third gear 63, and the fourth gear 67 correspond to a drive unit that rotates the first balancer shaft 60 and the second balancer shaft 65.

Unlike the housing 21 in the balancer device 20 of the first embodiment, the housing 51 includes a third chamber 55. The third chamber 55 is provided in place of the first chamber 25 and the second chamber 27 in the first embodiment. The third chamber 55 functions as a balancer housing chamber and a drive unit housing chamber.

The first balancer shaft 60 and the second balancer shaft 65 are installed in the housing 51 so as to be supported by the journal portion 64. At this time, the first balancer 61, the second gear 62, the third gear 63, the second balancer 66, and the fourth gear 67 are all housed in the third chamber 55.

The third chamber 55 functions as a high pressure portion. The third chamber 55 is provided with an oil injection hole 56. When the first balancer 61 and the second balancer 66 rotate in the third chamber 55, the pressure in the third chamber 55 becomes higher than the atmospheric pressure. Thus, the oil in the third chamber 55 can be jetted from the oil injection hole 56. The oil 80 jetted from the oil injection hole 56 can crush the bubble 80a of the bubble-containing oil.

The balancer device 50 houses the second gear 62, the third gear 63, and the fourth gear 67 in the third chamber 55. When these drive units operate, it is conceivable that bubble 80a is generated in the third chamber 55. However, the pressure in the third chamber 55 is higher than the atmospheric pressure. Therefore, it is considered that generation of bubble 80a is suppressed as compared with when the oil 80 is stirred outside the third chamber 55. In addition, since the balancer device 50 collects the first chamber 25 and the second chamber 27 in the first embodiment together, it is possible to make the configuration compact as compared with the balancer device 20.

Third Embodiment

Figure 6:
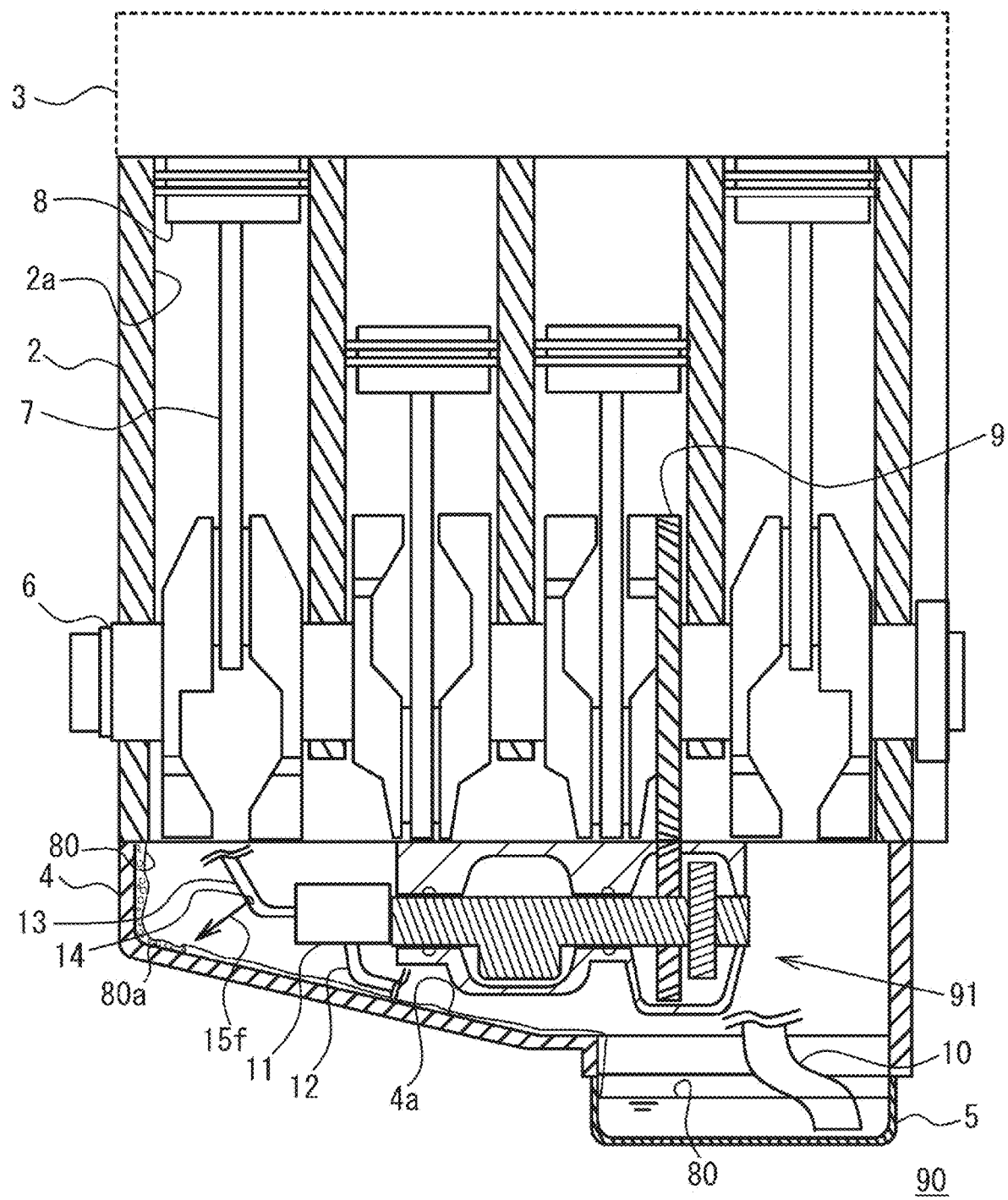
FIG. 6 is a cross-sectional view of the internal combustion engine of a third embodiment taken along the axial direction of the crankshaft and the axial direction of the cylinder.

Next, a third embodiment will be described. As illustrated in FIG. 6, the internal combustion engine 90 of the third embodiment includes a balancer device 91 instead of the balancer device 20 included in the internal combustion engine 1 of the first embodiment. In the balancer device 91, the oil injection hole 26 provided in the balancer device 20 is eliminated. The third embodiment includes an oil injection hole 14 provided in the oil discharge channel 13 instead of the oil injection hole 26.

The oil discharge channel 13 corresponds to a high pressure portion. The oil 80 discharged from the oil pump 11 and having a pressure higher than the atmospheric pressure flows through the oil discharge channel 13. Therefore, the oil 80 is injected from the oil injection hole 14 as indicated by the arrow 15f. The oil 80 injected from the oil injection hole 14 can crush the bubble 80a of the bubble-containing oil.

The above-described embodiments are merely examples for carrying out the present disclosure, and the present disclosure is not limited thereto. Various modifications to these embodiments are within the scope of the present disclosure, and it is obvious from the above description that various other embodiments are possible within the scope of the present disclosure.

What is claimed is:

1. An internal combustion engine comprising:
an oil storage portion in which a suction portion is disposed, the suction portion being a portion that sucks oil to be supplied to various parts of an internal combustion engine body;
an oil channel through which bubble-containing oil to be returned from the various parts of the internal combustion engine body to the oil storage portion flows; and
a high pressure portion that has a higher pressure than an atmospheric pressure and to which the oil is supplied, the high pressure portion being provided with an oil injection hole through which the oil is injected toward the bubble-containing oil flowing through the oil channel
wherein the high pressure portion is an oil discharge channel to which the oil sucked up by an oil pump via the suction portion is discharged, and the oil injection hole is provided in the oil discharge channel.

2. The internal combustion engine according to claim 1, wherein the high pressure portion is a balancer housing chamber in which a balancer of a balancer device is housed, and the oil injection hole is provided in a housing that constitutes the balancer housing chamber.

3. The internal combustion engine according to claim 2, wherein a drive unit that rotates a balancer shaft of the balancer device is housed in a drive unit housing chamber that is provided as a separate space different from the balancer housing chamber.

4. The internal combustion engine according to claim 1, wherein the oil channel includes a tilted surface along which the bubble-containing oil to be returned to the oil storage portion flows down, and the oil is injected from the oil injection hole toward the tilted surface.

* * * * *